United States Patent
Jimenez-Laguna et al.

(10) Patent No.: US 6,228,415 B1
(45) Date of Patent: *May 8, 2001

(54) BEVERAGE TOPPING

(75) Inventors: Antonio Jimenez-Laguna, Lausanne (CH); Josephine Lometillo, Hilliard, OH (US)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/272,080

(22) Filed: Mar. 18, 1999

Related U.S. Application Data

(63) Continuation-in-part of application No. 09/188,482, filed on Nov. 9, 1998, now Pat. No. 5,997,936.

(30) Foreign Application Priority Data

Nov. 11, 1997 (EP) .................................................. 97203469

(51) Int. Cl.⁷ ..................................................... A23G 9/02
(52) U.S. Cl. ........................ 426/565; 426/101; 426/590; 426/584
(58) Field of Search ..................................... 426/100, 101, 426/134, 565, 569, 570, 590, 593, 594, 130, 316, 317, 474, 587, 584

(56) References Cited

U.S. PATENT DOCUMENTS

| | | | |
|---|---|---|---|
| 2,048,364 | * 7/1936 | Willems | 99/137 |
| 3,492,126 | 1/1970 | Rubenstein et al. | 99/71 |
| 4,039,693 | 8/1977 | Adams et al. | 426/565 |
| 4,451,492 | 5/1984 | Dell et al. | 426/564 |
| 4,542,035 | 9/1985 | Huang et al. | 426/565 |
| 4,746,527 | 5/1988 | Kuypers | 426/569 |
| 5,017,390 | * 5/1991 | Sawant | 426/100 |
| 5,384,146 | 1/1995 | Gonsalves et al. | 426/565 |
| 5,520,946 | 5/1996 | Chablaix et al. | 426/570 |
| 5,780,092 | 7/1998 | Agbo et al. | 426/569 |
| 5,997,936 | * 12/1999 | Jimenez-Laguna | 426/565 |

FOREIGN PATENT DOCUMENTS

| | | |
|---|---|---|
| 433 847 | 3/1973 | (AU) . |
| 0 713 650 | 5/1996 | (EP) . |
| 2163284 | 5/1996 | (CA) . |
| 0 808 575 | 11/1997 | (EP) . |
| 0 916 266 | 5/1999 | (EP) . |
| 2 275 155 | 1/1976 | (FR) . |

OTHER PUBLICATIONS http://www.icecreamusa.com/good_humor/GBARNUT "Good Humor Multipacks", 2 pages.*

* cited by examiner

*Primary Examiner*—Keith Hendricks
(74) *Attorney, Agent, or Firm*—Pennie & Edmonds LLP

(57) ABSTRACT

The invention relates to a method for preparing a hot beverage having foamed milk-based topping. A frozen concentrated and aerated milk is combined with a liquid to form the beverage. The invention also relates to a product comprising a flavored beverage base and frozen milk concentrates constituting distinct separate portions of the product. The frozen milk incorporates gas, so that the product provides a flavored beverage having a foamed milk topping upon addition of a liquid.

28 Claims, 7 Drawing Sheets

BEVERAGE TOPPING

CROSS-REFERENCE TO RELATED APPLICATIONS

This application is a continuation-in-part of application Ser. No. 09/188,482 filed on Nov. 9, 1998, now U.S. Pat. No. 5,997,936.

TECHNICAL FIELD

The present invention relates to the making of a hot aerated or foamed liquid product or beverage. In particular, the invention includes a process for making a foamed topping for a hot beverage, more particularly for making a Cappuccino-style coffee beverage, and to the resulting beverages.

BACKGROUND ART

Conventional instant hot Cappuccino dry-mix compositions are based on powder components such as dried coffee solids, dried milk solids with added flavors, stabilizers, and sweeteners. These coffee and milk concentrates are usually in a granular or particulate form incorporating a gas. The addition of boiling water or hot milk to these concentrates results in an instant beverage with a foam topping. The formation of a foamed phase above the coffee/milk liquid is due to physical or chemical means of gas incorporation into the milk solids. Cappuccino compositions of the above-discussed types are described in European Patent Application 01 54 192 and PCT Patent Application WO96/08153.

It has been found that the incorporation of gas into the powder can change the density of the powder making it more fragile. The amount of gas incorporated may thus be limited by limitations on the density of the powder. Furthermore, for some powder compositions, a high foam volume in the final beverage may be difficult to achieve.

SUMMARY OF THE INVENTION

The invention relates to a method of preparing a beverage having foamed milk-based topping which comprises preparing a frozen concentrated milk having an overrun of at least 80%, and combining a liquid with the frozen concentrated milk to form the beverage. A beverage-forming component, such as a flavored beverage base, can be present separately or be added in the liquid in order to form the beverage. The preferred beverage-forming components include coffee, cocoa, or chocolate-based components, or mixtures thereof. These components can be in dry powder or liquid form.

Advantageously, the frozen concentrated milk is associated with a beverage-forming component before adding the liquid thereto. One way to do this is to form layers of the components as a separate product. A preferred product is formed by co-extruding the beverage-forming component and frozen concentrated milk. Thereafter, the product simply needs to be combined with a liquid to form the beverage.

Often, a hot beverage is desired. To obtain this, the liquid may be heated to a temperature of at least about 40° C. before the beverage is formed. Alternatively, the beverage may be heated after the liquid is added. Typical liquids include water, milk or mixtures thereof.

The invention also relates to a product comprising a beverage-forming component and a frozen milk concentrate component, wherein the frozen milk concentrate component incorporates a gas therein at an overrun of at least 80%, with the components constituting distinct separate portions of the product and being present in amounts sufficient to form a beverage having a foamed milk topping thereon after addition of a liquid to the product and melting of the frozen milk concentrate component. Preferred beverage-forming components include cocoa or coffee with the coffee being in the form of soluble coffee or a frozen coffee liquor. The distinct components are generally present in layers. If desired, a handle can be used for supporting the beverage-forming component and milk concentrate.

Another embodiment of then invention relates to a package comprising the beverage-forming component and frozen milk concentrate component. As above, the frozen milk concentrate component incorporates a gas at an overrun of at least 80%, and the components being present in amounts sufficient to form a beverage having a foamed milk topping thereon after addition of a liquid thereto and melting of the frozen milk concentrate component.

The package typically includes a first compartment for the beverage-forming component and a second compartment for the frozen milk concentrate component. Preferably, this package is in the form of a cup wherein the beverage-forming component and frozen milk concentrate component are present in amounts sufficient for one serving, with the cup being adapted to receive and retain liquid for forming the beverage.

In another embodiment, the frozen product comprises a beverage-forming component and a frozen milk component, wherein the frozen milk component incorporates a gas therein at an overrun from 80% to less than 150%, with the components constituting distinct separate portions of the product and being present in amounts sufficient to form a beverage having a foamed milk topping thereon after addition of a liquid to the product and melting of the frozen milk component.

In a preferred embodiment, the milk component comprises an emulsifier or a blend of emulsifiers. The emulsifier improves the gas incorporation, the stiffness, volume and stability of the foaming milk topping. It also enhances the whitening effect of the topping.

In a preferred embodiment, the milk component comprises a thickening agent. A suitable thickening agent is a hydrocolloid, and preferably is a guar gum. The thickening agent is added in an amount sufficient to increase the viscosity of the milk component. It also improves gas incorporation into the milk component. This ingredient is typically used in a small amount, preferably about 0.05 to 0.45% by weight of the total concentrated milk component.

In a preferred embodiment, the milk component comprises a monoglyceride. This ingredient is also used in a small amount in the mix, and also improves the gas incorporation. A typical amount is about 0.01 to 0.6% by weight of the milk component.

In another embodiment, the milk component comprises: skimmed milk, fat, sugar, emulsifier or blend of emulsifiers, a thickening agent and water. The fat can advantageously be cream with 40% fat in an amount of between about 10 to 30% by weight of the total amount of the milk concentrate component.

The invention also relates to a method of producing a frozen product intended for the preparation of a hot beverage with a foamed milk-based topping. The frozen product generally comprises a beverage-forming component and a frozen milk component, and the method includes the steps of mixing the ingredients to provide a milk-based phase, homogenizing the milk-based phase, heat treating the milk-based phase, incorporating gas into the milk-based phase until the suitable level of overrun is achieved, and filling a mold with frozen milk-based phase and the beverage-forming component.

In a preferred embodiment, incorporating gas is achieved by freezing the milk-based phase while including applying mechanical tossing to the milk-based phase. In another embodiment, incorporating the gas is achieved by aerating the milk-based phase.

Preferably, after filling the frozen milk phase, a central portion of the frozen milk-based phase is withdrawn so as form an outer shell of the frozen milk phase and leave a central cavity into which the beverage-forming component is filled to form the core of the frozen product.

It is also desirable that after filling the beverage-forming component in the central cavity, the top of the beverage-forming component is covered by frozen milk so as to form an encased core of the beverage-forming component. To do this, a certain amount of the frozen milk is refilled onto the beverage-forming component in the top portion of the cavity.

Finally, the invention also relates to a frozen product intended for the preparation of a hot beverage with a foamed milk-based topping; the frozen product comprising a beverage-forming component and a frozen milk component, wherein the product has the shape of a bar comprising a core of the beverage-forming component and an outer shell of the frozen milk component encasing the core.

BRIEF DESCRIPTION OF THE DRAWINGS

The invention will now be further described with reference to the drawings, in which.

DETAILED DESCRIPTION OF THE PREFERRED EMBODIMENTS

Figure 1A:
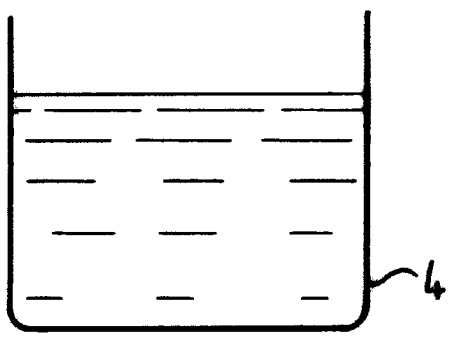
FIGS. 1A, 1B and 1C are illustrations of the making of Cappuccino on the basis of frozen concentrated milk and frozen coffee liquor components.

The present invention aims at providing a hot beverage such as a Cappuccino product that has the following characteristics:

1) Improved foaming properties.
2) Taste, texture and appearance close to authentic Italian Cappuccino.
3) Improved coffee taste in the liquid portion and improved coffee-to-milk flavor balance in the whole beverage preparation.

Accordingly, in a first embodiment, the invention relates to a method of use of frozen concentrated milk having an overrun of at least 80 to 150% or more for preparing a hot beverage having foamed milk-based topping on the addition of a liquid.

It has surprisingly been found that upon the addition of a liquid a foamed milk-based product is formed on the top of a hot beverage. The liquid may be added cold and then heated with the topping or it may be hot or boiling when it is added to the frozen concentrated milk. If the beverage needs to be heated, this may conveniently be done in a microwave oven or by other means of providing heat into the product.

The invention is particularly suitable for the preparation of a beverage with a milk topping, the beverage being formed from a beverage-forming component selected from the group consisting of a coffee, cocoa, or chocolate-based component or mixtures thereof.

According to the invention, an improved milk aroma/flavor in the foam phase is obtained compared with dried foamable products as the frozen milk concentrate is made without a drying step. In addition, it is believed that the functional properties of the milk ingredients are improved. It has been found that the invention provides a balance of taste and aroma which is close to that of an original formula of authentic Italian Cappuccino. This is believed to be due to the use of milk solids which subjected to much less processing than dried powder ingredients. Milk solids are generally not processed except for an initial heat-treatment for pasteurization and possibly one concentration step.

In addition, the present invention reduces or avoids the problems related to lump formation during reconstitution of dried-coffee mixes with incorrectly tempered (e.g., boiling) water. It has furthermore been found that the milk proteins in frozen form are better protected against heat than dried products, and that the pH induces flocculation when the milk proteins are reconstituted simultaneously with coffee solids.

Suitable liquids for forming the beverage include water, milk or mixtures thereof. Liquid products based on coffee, tea, cocoa, chocolate, or mixtures thereof can also be used. In a preferred embodiment of the invention, the frozen concentrated milk component is used together with a flavored beverage base, such as instant coffee, cocoa, chocolate, fruit favors, vegetable favors, and combinations thereof. If these beverage bases are used in connection with the frozen milk concentrate, the consumer simply needs to add water or milk and do the necessary heating in order to obtain a hot flavored beverage with a foamed milk topping. The invention allows the liquid part and the foamed topping to be reconstituted as two distinct phases or, if desired, as a homogeneous composition if sufficient mixing is applied.

The milk used for the frozen concentrated milk is conveniently pasteurized milk such as whole or skimmed milk. The milk is advantageously pasteurized whole milk. The expression "milk" also covers products derived from milk such as liquid creams. An example of a liquid cream is half-cream that contains about 15% fat.

Pasteurized whole or skimmed milk is concentrated by conventional evaporation or any other technological means of concentration, including freeze-concentration, reverse osmosis, ultra-filtration, etc. After concentration, the total content of milk solids is suitably from 10 to 70%, typically 30 to 60% and preferably greater than about 20%.

Suitable concentrated milk components can be prepared with the following composition:

water in an amount of about 30 to 60% by weight,

Non Fat Dairy Milk in an amount of up to 40% and preferably about 10 to 30% by weight, Cream (having between about 10 and 50% fat) in an amount of about 10 to 30% by weight, Sugar in an amount of about of 0 to 8% and preferably about 1 to 5% by weight, a monoglyceride in an amount of up to 1% and typically in the range of about 0.01 to 0.6% by weight, an emulsifier in an amount of up to about 0.8% and typically between about 0.1 and 0.5% by weight, a thickening agent in an amount of up to about 0.5% and typically between about 0.01 to 0.45% by weight, The concentrate contains about 10 to 30% by weight water, and typically has a specific Gravity ("Sp. Gr.") of between about 1 and 1.3 g/ml, and a total solids in the range of about 30 to 45%.

Among the list of ingredients, the monoglyceride has proved to be useful for achieving enhanced air incorporation into the mix in addition to the foam formation from the protein that is present in the recipe. It can be used as is or in a distilled form, if desired.

The emulsifier also has an important role in the mix as it influences the rate of whipping as well as the stiffness, volume and stability of the finished topping foam. The emulsifier also enhances the white foam color of the topping.

The emulsifying system is preferably a combination of a distilled monoglyceride and an organic acid ester. One commercial ester is the tartaric ester of a fatty acid, and is available from Datem as Panodan 150. The addition of this system improves the fat particle distribution in the product and therefore provides an enhanced whitening effect.

The use of a small amount of a thickening agent or hydrocolloid such as guar gum also helps in slightly increasing the viscosity of the base mix. This also enables increased air incorporation at the high drawing temperature for the product.

After the concentrate is prepared, it is then frozen. Conventional ice-cream freezers may be used for this purpose. In an alternative, however, the freezing may take place in an extruder, preferably a twin-screw extruder. In the extruder, the pressures and flow rates in extrusion die can be adjusted such that the milk portion of the product is aerated to an overrun of as high as 200% or greater, as desired. The flow rates of the supply of the milk and coffee solids are regulated to produce different combinations and formulations of milk and coffee frozen solids. It is advantageous that the milk concentrate is pre-aerated before entering the twin-screw freezer/extruder. Freezing in an extruder is described in co-pending PCT patent application WO97/43904, the content of which is expressly incorporated herein by reference.

This PCT patent application describes a cold extrusion technology by which evaporated or concentrated milk solids are frozen and aerated in a manner such that a phase-stable milk drink is obtained upon by addition of water to the solids or as they melt to room temperature. Twin-screw freezing technology enables continuous mixing, aeration and freezing of milk solids. Furthermore, it allows a flexible manner of gas incorporation and can give a better control of foam texture and volume in the final beverage preparation.

Optionally, the milk mix or phase can experience an operation of preaeration in a aerating device to produce a whipping in air of the mix so as to achieve a higher level of overrun. A suitable device to achieve this can be a commercially available "Aeromixer" device.

Figure 7:
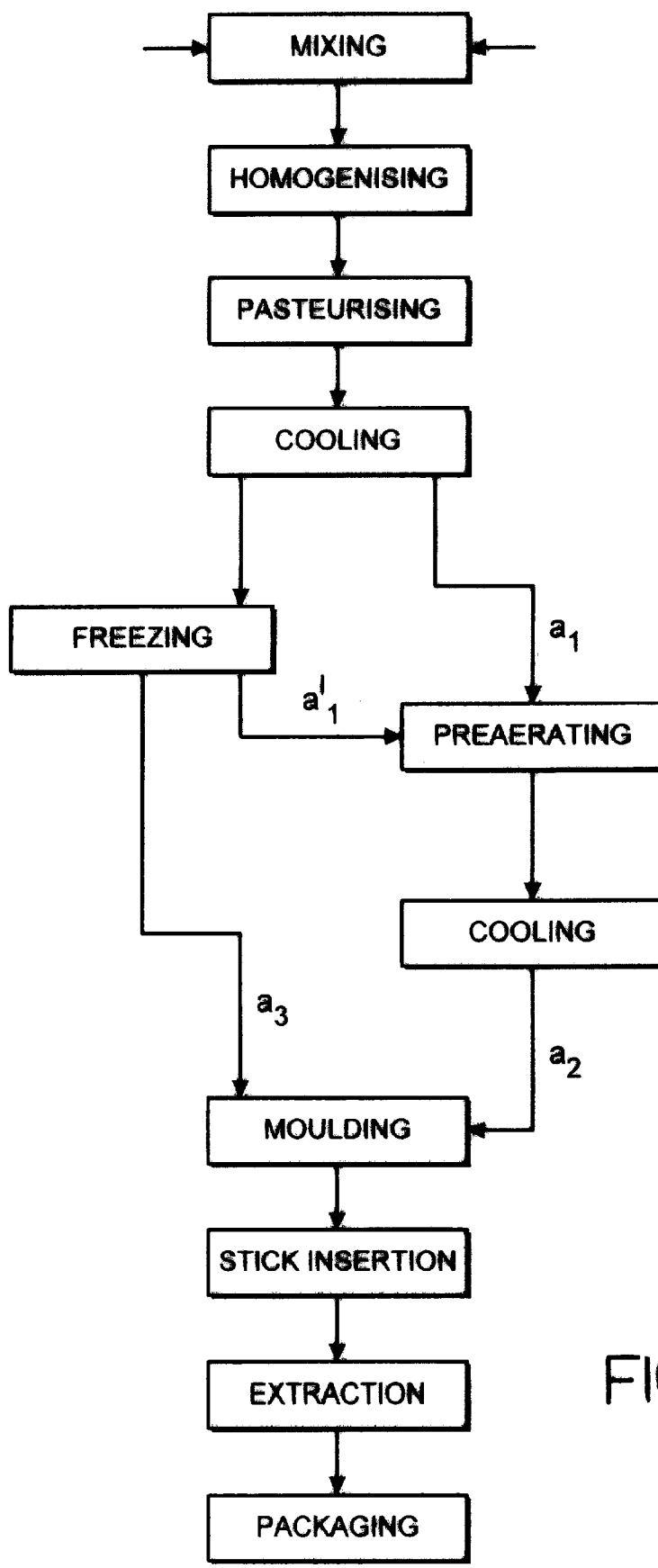
FIG. 7 is a flowchart according to an alternative method of producing the frozen bar-shaped product of FIGS. 5 and 6, FIGS. 8a–8d illustrate the process of filling the molds to obtain the frozen bar-shaped product of FIGS. 5 and 6, FIGS. 9a, 9c, 9d illustrate a variant of the process of filling the molds to obtain the frozen bar-shaped product.

As shown in FIG. 7, in a first embodiment $a_1$–$a_2$, the freezing operation can be bypassed so that the refrigerated mix is directly introduced into an aerator. The aerator is used as an alternative to the freezer provided that the mix temperature is maintained at no higher temperature than 4° C. prior to filling in the mold.

In a second alternative $a'_1$–$a_2$, the aerating operation follows the freezing step. The use of the Aeromixer permits an increase in overrun, i.e., to higher than the 110 to 130% that can be achieved when using the freezer only. After aerating, a cooling step is carried out to cool down the whipped mix due to heat built-up during the high shear mixing in the aerator. The cooling step can be processed in a heat exchanger, for example.

In a third alternative $a_3$, the aerating operation can also be bypassed when overrun level has properly been reached in the freezer, i.e., to a preferred level of about 110–120%.

The preaerating device allows for the enhanced incorporation of gas with a use of a high shear air mixer which run from a speed of 200 to a maximum of about 10,000 rpm and above. The mix contained in the mixing head with variable speed drive, is processed under high pressure to obtain the proper degree of mixing, complete gas (air) incorporation and the production of good texture and very fine cell structure. The aerator used was either the Oakes mixer (Model 8M3) or an Aeromixer.

Figure 8:
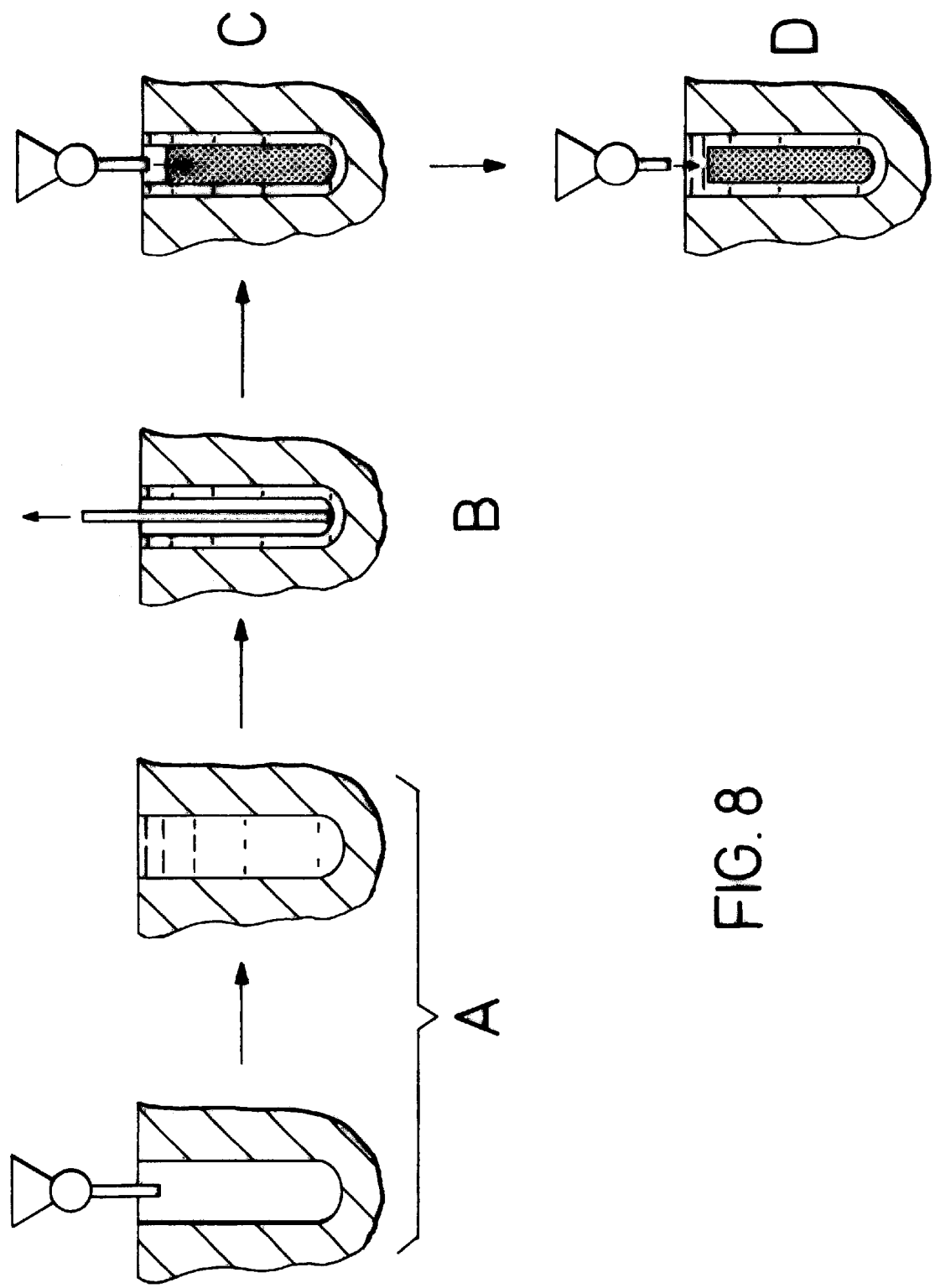

The next step in the process is the filling of molds with the frozen milk phase in a conventional stick machine line. FIG. 8 illustrates the different stages of filling into these molds. The invention can use a conventional top-down filler of the type used in filling molds on a stick machine line.

In a first stage, the mold is filled with the frozen milk concentrate until the inner surface of the mold is entirely covered by the concentrate. An overrun of 160% can also be achieved by this process. With a high level of overrun, and due to the higher viscosity of the frozen milk phase, a bottom-up filler device is desirable to ensure the bottom of the mold is properly filled with the frozen milk layer. An uneven fill causes processing problems like holes or coarse surfaces and air pockets on the frozen bar which could come out to be not aesthetically acceptable to the consumer. The bottom-up filler is an alternative to the conventional top-down filler. The bottom-up filler has a rubber composite, food grade hose; it is positioned in such a way that the bottom or lower tip of the rubber hose is inside the mold and close to the mold base surface. The mold is filled with frozen product from the bottom to the top. Bottom-up fillers are well known and commercially produced by SIDAM.

In a second stage B, a back suction of the central portion of the concentrate is carried out so as to leave a cavity of suitable volume.

In a third stage C, the flavored beverage component, preferably a coffee concentrate, is dosed until the proper level of concentrate component is attained while leaving a minimal thickness on the top to allow the final stage D to be carried out.

For example, reconstituted coffee concentrate for the flavored beverage component is used. Preferably, the coffee concentrate has a concentration of about 45%. The concentration preferably used results in the fluid consistency of the coffee mixture for ease of handling.

In an alternative, a spray mix can also replace the reconstituted coffee concentrate. In this context, "spray mix" means the result of the concentration of the coffee bean slurry prior to the production of soluble coffee powder before carrying out the freeze drying operation. The spray mix is in a liquid form with a fluid consistency, typically at 50–60% total solids.

In the final stage D, the outer shell is closed by pouring a top layer of frozen milk concentrate over the volume of the inner core so as to top off the bar and form a closed homogeneous appearance of the bar.

The stick line device for achieving the A–D stages comprises a cryogenic freezing arrangement to draw the mold at the suitable very low temperatures. The cryogenic freezing arrangement usually includes a cold brine reservoir that contains a cryogenic agent to enable the freezing of the mixture inside the individual molds. The temperature of the brine is about −40 to about −50° C. generally, the stir stick or handle is inserted into each semi-frozen bar in separate molds. Further down the line, a brine warmer which is preferably warm water heated to about 20 to 26° C. causes the bar surface to warm up enough to be demolded and extracted from the mold.

This method permits to produce the frozen bar of the invention comprising a core of the flavored beverage component such as coffee concentrate, and a sufficiently hard frozen shell of the milk component. The benefits of such a configuration are that the shell has a uniform thick layer that prevents breakage of the shell and/or leakage of the coffee component which remains in a prefrozen state after the bar is formed.

Figure 2A:
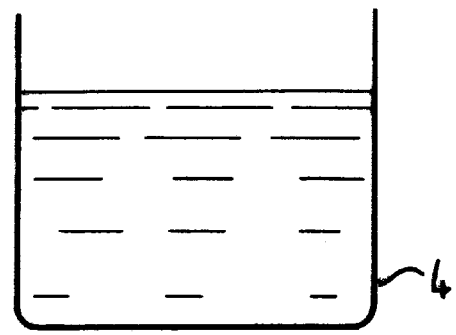
FIGS. 2A, 2B and 2C are illustrations of the making of Cappuccino on the basis of frozen concentrated milk and soluble coffee components.
Figure 1B:
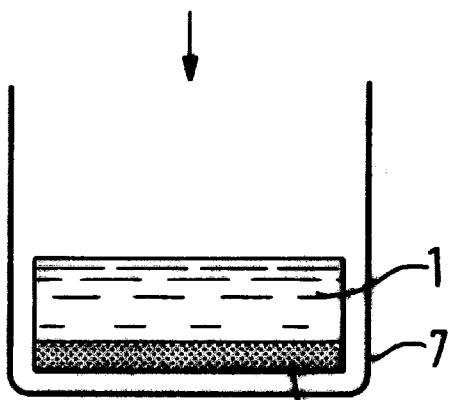
Figure 2B:
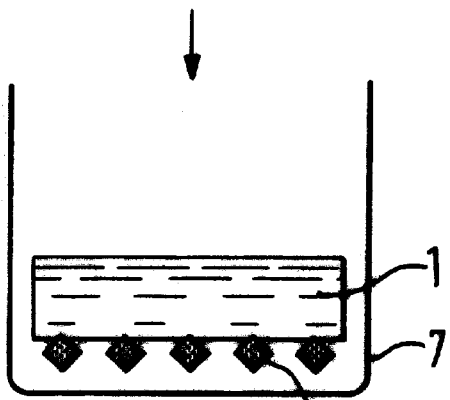

Surprisingly, it has been found out that the final beverage product delivers a higher foam volume than structures in two or multi-layers shown in FIGS. 1B or 2B. It must be noted that further hardening of the frozen bar would freeze the core of flavored concentrate.

The hardening of the core also depends from the concentration of the flavored beverage component. In general, the higher the concentration used, the harder it is to freeze the coffee concentrate. Sugar concentration also plays a role as it has been proved to promote the freezing of the core.

Figure 9:
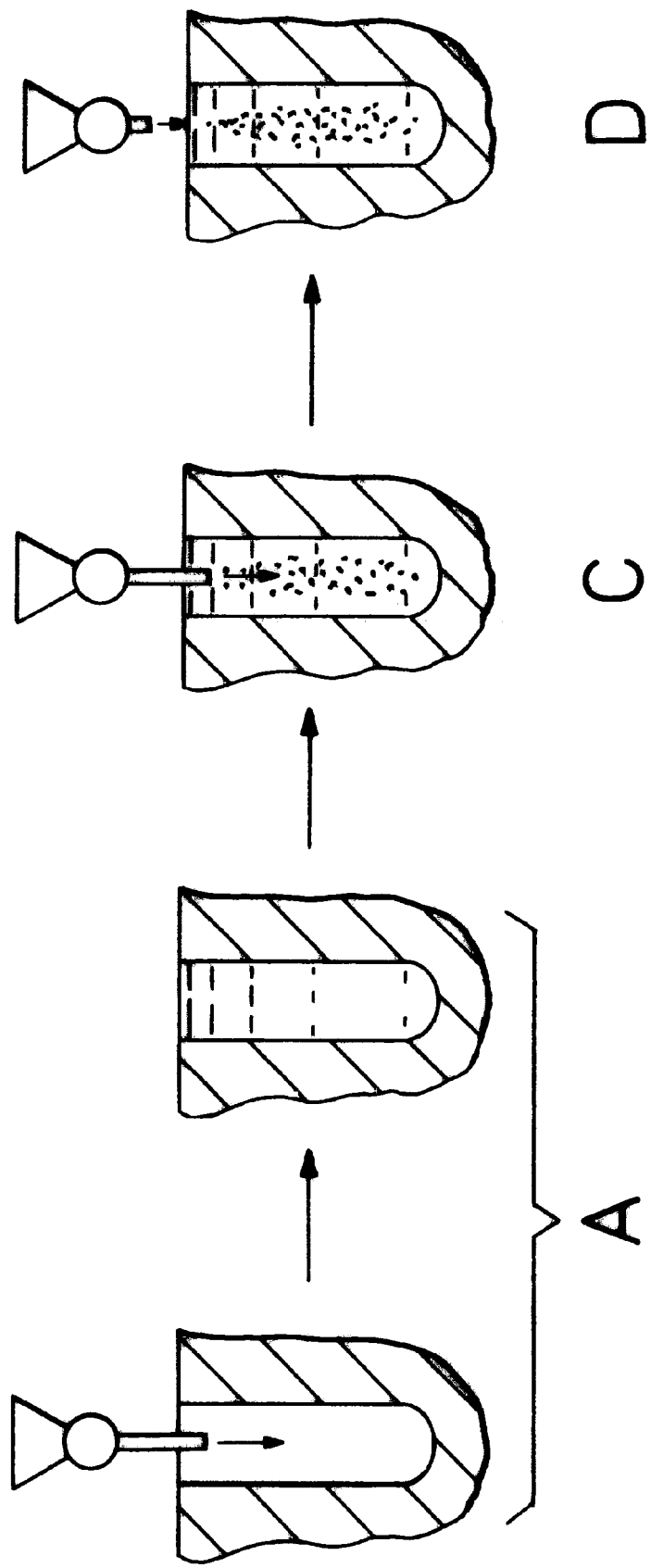

In an alternative shown in FIG. 9, no back suction step B occurs. The mold is filled with the frozen milk concentrate in step A. Then, the flavored beverage component is dosed through the frozen milk layer (step C). Finally, top off with frozen milk can be applied when necessary to properly encase the core (step D).

The next operation consists of wrapping and/or packaging the bars individually or in groups. It is also preferred to keep the bars in a blast freezer for at least 2 hours so as to reach a core temperature of −22° C. The blast freezer temperature has generally a temperature of about −40° C. Industrial storage of the products is then recommended in a hardening room regulated at a temperature of −30° C. For sealed packages, a one year shelf-life in frozen conditions is possible.

In a manner as described above, a coffee extract is concentrated by conventional evaporative means. A suitable concentrate has a total solids content of 15 to 70% by weight, and preferably from about 40 to 70%. Additional aromatization of the coffee extract is also possible, if desired.

In a preferred embodiment of the invention, the concentrated milk forms part of a topping base and constitutes at least 90% and preferably above 95% by weight of the non-aerated topping base (i.e., of the solid components of the topping base). In a particularly favorable embodiment of the invention, 97 to 99% by weight of the topping base is concentrated milk. The topping base is aerated and frozen to form a frozen topping material. The high percentages of concentrated milk in the topping material provide a clear and distinct milk flavor to the topping when reconstituted.

Overrun is defined as the volume percentage of a gas, usually air, in relation to the gas-free constituents of the volume. An overrun results from whipping action or aggregation. In this invention, the milk can be aerated with a gas selected from the group consisting of oxygen, nitrogen, carbon dioxide, air and other mixtures thereof.

The overrun of the frozen concentrated milk may be in the range of from about 80 to 250%, preferably at or above 110%, and more preferably at least 130%. An overrun of from about 200 to 250% is achievable, if desired. An overrun of 110 to less than 150% is a preferred working range. The level of overrun can be chosen depending on the how airy or light one wishes the topping to be. Higher overruns result in a higher, lighter and more aerated topping. With an overrun of about 130%, the topping will generate a thin layer of foam on the beverage.

In the present context, "hot" means at least about 40° C. It is preferred to provide a beverage temperature of above about 50° C., and more preferably in the range of 55 to 85° C. The beverage is conveniently heated by electromagnetic heating, such as microwave heating either in a conventional oven or on a hot plate. Generally, the beverage is heated to the desired temperature and the topping is completely melted. Of course, the desired temperature of the beverage and topping can be selected according to the preferences of the consumer.

If very hot or boiling water is used to form the beverage, there often is no need for additional heating. In this embodiment, the beverage will usually be served at a temperature range of 45 to 68° C. to as high as 75° C. If desired, the beverage could even be consumed before the topping is totally melted. At that point, the beverage will be hot while the topping will be relatively cool.

In another embodiment, the invention relates to a product comprising a flavored beverage base and frozen milk concentrates constituting distinct separate portions of the product. In this embodiment, the frozen milk incorporates gas at an overrun of at least 80% so that the product provides a flavored beverage having a foamed milk topping after addition of a liquid and subsequent melting of the frozen milk.

A suitable flavored beverage base is cocoa or coffee in the form of soluble coffee or frozen concentrated or non-concentrated frozen coffee liquor. The separate distinct portions of milk concentrates and flavored beverage base are preferably generated by layering the portions onto one another. By having distinct portions of the flavored beverage base and milk, it is possible to generate a product which, upon the addition of a liquid, has a topping of a high degree of whiteness and clear milk taste over a beverage portion which has the flavor of the beverage base. Alternatively, the distinct portions of the product may be provided by coextruding the two portions.

Considerations with regard to preferred embodiments of the invention in connection with the use discussed above are also applicable to the product and visa versa.

For the making of Cappuccino, the frozen concentrated milk has a solid content from about 10 to 50% by weight and the flavored beverage base is frozen concentrated coffee liquor having a solids content from about 15 to 70% by weight.

For the making of one cup of hot beverage one uses for example from about 75 to 150 ml or about 10 to 30 grams of concentrated milk having a solids content from about 20 to 50%. The appropriate amount depends on the desired thickness, taste and texture of the topping.

In addition, a beverage prepared in accordance with this invention may also be used for the making of an airy Café-au-lait beverage. This can be obtained if the product is subjected to sufficient mixing or stirring, thus distributing the aeration and milk throughout the beverage.

Figure 5:
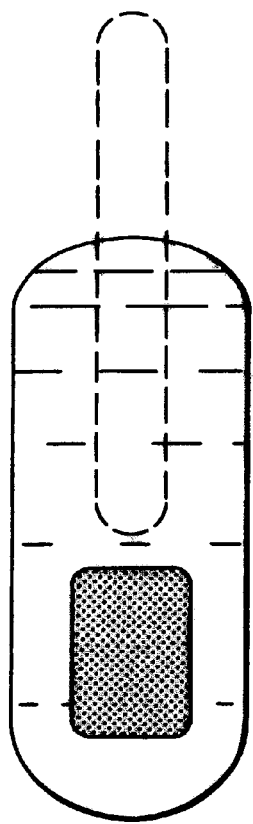
FIG. 5 is an illustration of a finished frozen bar-shaped product comprising an outer shell of frozen milk and an inner core of beverage forming component such as coffee or similar, FIG. 6 is a longitudinal cross-sectional view of the frozen bar-shaped product as illustrated in FIG. 5.

It has been found that for certain applications it is advantageous to arrange the flavored beverage base and frozen milk concentrate on a handle. As illustrated in FIG. 5, The handle conveniently extends into the product and is preferably a rigid member such as a stick or a spoon. The advantage of the handle is that the preparation of the beverage can be done without use of an additional spoon other than the one provided with the product. Furthermore, the use of a handle eases demolding and transport of the product during production and packaging.

The invention also relates to a package comprising a portion of flavored beverage base and a portion of a frozen concentrated milk, where the frozen milk incorporates gas at an overrun of at least 80%. The portions of base and milk provide a flavored beverage having a foamed milk topping upon addition of a liquid and thawing of the milk.

Conveniently, this package comprises a first compartment that includes the flavored beverage base portion and a second compartment that contains the frozen concentrated milk portion. In a special version of this embodiment, the package is in the form of a cup comprising sufficient amounts of flavored beverage base and frozen concentrated milk for one serving, with the cup being adapted to receive sufficient liquid for reconstitution and the making of the beverage. This is a favorable way of distributing the product. As for the preparation of the product, the consumer only needs to add a liquid such as water or milk of the desired temperature.

The invention also relates to a method for providing a hot beverage with a foamed topping. This method comprises the steps of: providing concentrated milk; freezing the concentrated milk concentrates; incorporating gas into an overrun of at least about 80%, and preferably about 110 to 250%; more preferably about 130 to less than 150%, and adding a liquid with heating if necessary to make a hot beverage with a foamed topping. Considerations as to preferred ways of carrying out this method were described previously.

Figure 6:
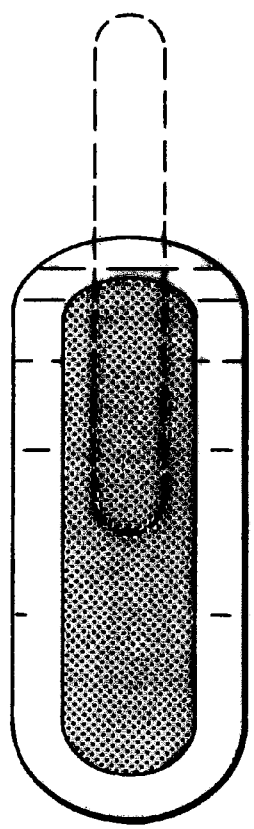

In a further alternative illustrated in FIGS. 5 and 6, it is advantageous to arrange the frozen product so it has a bar shape comprising an outer shell of frozen concentrated milk component which delimits a closed inner cavity. The cavity is at least partly filled with the beverage-foaming component forming an inner core encased by the outer shell. This shell-and-core structure provides a superior foam delivery than other layering structures. In addition, the structure is stronger and less sensitive to breakage which would cause leakage of the beverage foaming component at relatively high freezing temperatures.

In FIGS. 5 and 6, the product is a typical spade-shaped bar, but other various shapes can be envisioned, such as for example, shapes having cylindrical round transversal sections with either a flat or rounded bottom.

In a preferred embodiment, the frozen concentrated milk component is an emulsified mixture, in addition to skimmed milk powder, emulsifier and a thickening agent. A preferred example of thickening agent is hydrocolloid, with guar gum being more preferred.

Figure 10:
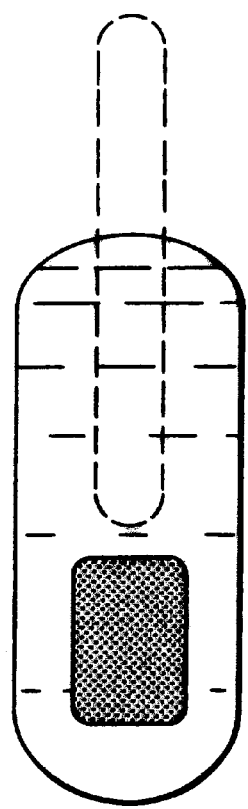
FIG. 10 is a longitudinal cross-sectional view of a variation of the frozen bar-shaped product according to the invention.

FIG. 10 shows an alternative embodiment in which the flavored beverage component constituting the core of the bar is located at a lower portion of the bar while the upper portion of the bar is completely filled by the frozen milk component. Such a structural configuration promotes a proper separation of the two distinct phases during thawing.

Figure 11:
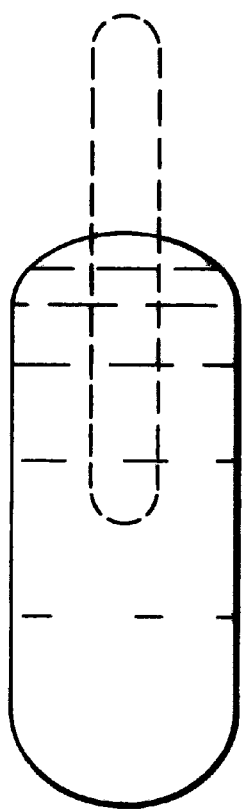
FIG. 11 is a longitudinal cross-sectional view of another variation of a frozen bar-shaped product according to the invention.

FIG. 11 is another alternative in which the frozen bar has only the frozen milk concentrate. In that case, the flavored beverage component can be separately formed. For example, the flavored beverage component can be a coffee liquor component packaged in a cup or a pouch.

In another alternative, the flavored beverage component can also form the outer shell while the milk component represents the core of the frozen bar. In that case, the flavored beverage component, such as coffee concentrate for example, preferably contains a suitable amount of sugar so as to be capable of hard freezing around the frozen milk core.

The overrun is usually determined by weighing the frozen product and submerging it into water to determine its volume according to Archimede's principle.

EXAMPLES

The following examples are provided as illustrations of preferred products and formulations of this invention. All parts are given by weight unless otherwise noted.

Example 1

A concentrated skimmed milk is advantageously frozen by using twin-screw freezing to form a topping component.

The skimmed milk is pasteurized and then introduced at 25° C. into an evaporator where it is concentrated to 30% dry matter. This concentrate is introduced into a twin-screw extruder, the barrel of which has nine 100 mm long segments F1 to F9 with which are associated individual cooling circuits through which a water-alcohol mixture passes. It is possible to introduce air from either side of the barrel by means of a piston provided with a mass flow meter.

The operating conditions are given below:

Configuration of screws 1 and 2

| Segments | F1 | F2 | F3 | F4 | F5 | F6–F7 | F8–F9 |
| --- | --- | --- | --- | --- | --- | --- | --- |
| Screw type | T | T | T | M/C | T | CO | CO | where T stands for Transport, M stands for Mixing, C stands for Shear and CO stands for Compression Without air injection.

Flow rate/temperature of concentrate: 10 kg/h in F1/5° C.

Rate of rotation of screws: 400 rpm.

Diameter of die (without outlet pipe or valve): 1.2 mm

Temperature in the barrel segments and die plate:

| Segments | F1–F2 | F3 | F4–F9 | Plate |
| --- | --- | --- | --- | --- |
| Temperature (° C.) | +3 to +5 | T | −10 to −11 | −8 to −10 |

The temperature of the mass on emerging from the die is −9° C.

The product obtained has an oily and creamy texture, which is not the case when the same concentrate is treated in a conventional freezer. This product shows good stability on freezing with a minimum of retraction in area. Its behavior on thawing is also different and it melts much more slowly. It produces a much colder sensation in the mouth. The frozen concentrate is perfectly homogeneous, without solid/liquid phase separations, and can be stored without adverse changes at −18° C. When solidified at −18° C. and brought to room temperature, the frozen concentrate retained its shape for at least 30 minutes, whereas the same product treated in a conventional freezer became entirely liquid in less than 15 minutes. Moreover, the product was stable to temperature variations.

Example 2

Milk/Coffee tablets are prepared as follows:

A concentrate of coffee solids is prepared of reconstituted soluble coffee. This is deposited in the bottom of a plastic cup and stored under freezing conditions.

Concentrated whole milk is frozen in a twin screw freezer in the manner described in Example 1. A portion of the frozen aerated concentrated milk is compacted or arranged in a particular pattern on top of the frozen coffee concentrate to form a tablet having a layer of coffee and a layer of concentrated milk. The overrun of the product is in the range of from 200 to 250%.

The tablets that are formed contain:
3 to 7% coffee solids
15 to 30% milk solids
3 to 7% sugar
60 to 65% water Similarly, tablets are prepared with a coffee portion of coffee liquor having a solids content of 10 to 20% by weight. The coffee liquor is then frozen.

Beverages can then be prepared from the tablets by the addition of heated water or milk.

Example 3

A cup of Cappuccino is made using a tablet having a concentrated milk part and a flavor beverage base.

FIG. 1B illustrates this tablet 10 positioned in a cup 7. The tablet has an upper layer of frozen concentrated milk 1 and a bottom layer of frozen flavor beverage base 2.

A frozen 35-gram tablet prepared as described in example 2 is e.g. used. It comprises 2 gram coffee solids, 10 gram milk solids, 20 gram water and 1.5 gram of sugar.

Figure 1C:
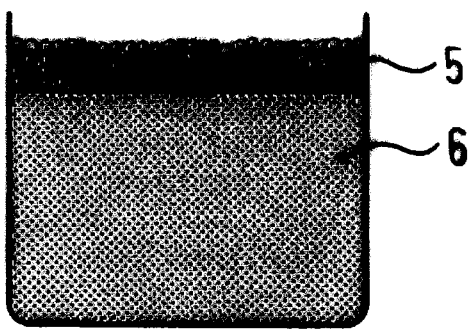

The tablet is positioned in a cup 7 and water 4 is added. A suitable amount is 100 ml as illustrated by FIG. 1A. The tablet and the water are then heated in a microwave oven and a Cappuccino beverage is generated as shown in FIG. 1C. The Cappuccino is examined; it has a distinct lower coffee beverage part 6 covered with a white milk foam layer 5.

The cup 7 may be the package in which the aerated frozen concentrated milk is sold. The concentrated milk may be with or without the flavored beverage base. If the product is sold in a cup package, the consumer can prepare the product by simply adding an appropriate liquid to the cup and perform any necessary heating. In an alternative version, not shown in the drawings, the package has two compartments: one for the concentrated milk and one for the flavored beverage base. This allows the consumer to adjust the taste of the beverage by varying the amount added of the beverage base.

Example 4

Figure 2C:
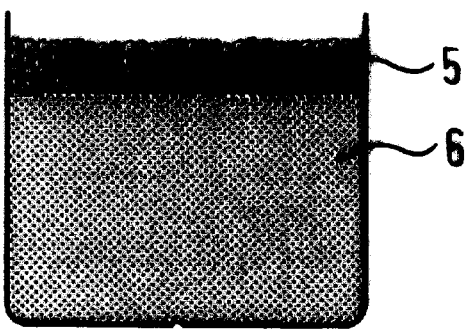

A coffee beverage being prepared in a manner similar to that described in Example 3. Here, however, the coffee liquor 2 at the bottom of the cup is replaced by soluble coffee portions 3, as shown in FIG. 2B. Again, the amount of water is as shown in FIG. 2A and the resulting beverage is shown in FIG. 2C, where the coffee beverage part 6 is covered with a white milk foam layer 5.

Example 5

Figure 3A:
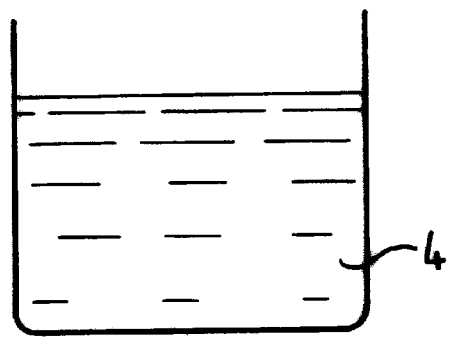
FIGS. 3A, 3B and 3C are illustrations of the making of a coffee beverage from co-extruded coffee liquor and aerated frozen concentrated milk components.
Figure 3B:
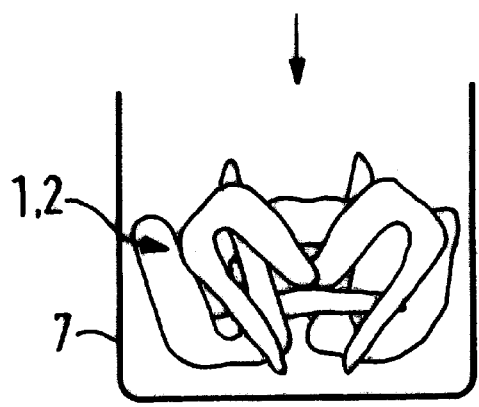
Figure 4:
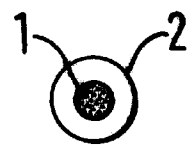
FIG. 4 is a cross-sectional view of the co-extruded coffee liquor and aerated frozen concentrated milk product shown in FIG. 3B.

A concentrate of coffee solids 2 made of coffee liquor having a solid content of 10 to 40% by weight is illustrated in FIG. 3B. The coffee concentrate 2 is co-extruded with the frozen aerated concentrated milk 1, as shown in the cross-sectional depiction of FIG. 4.

Figure 3C:
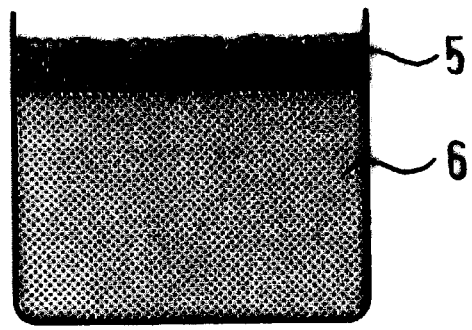

A coffee product is prepared as discussed in Example 4. The beverage having a coffee beverage part 6 and a foamed milk topping 5 is generated, as shown in FIG. 3C using an amount of water as shown in FIG. 3A.

If desired, the product can be made into an airy café-au-lait type of product by stirring the contents so as to distribute the foam 5 throughout the beverage part 6.

Example 6

A concentrated milk component is prepared with the following composition:
52.85% by weight water
20.4% Non Fat Dairy Milk (low heat)
23.1% Cream having 40% fat
3% Sugar (Baker's Special, sucrose)
0.2% Distilled monoglyceride (Dimodan BPTK)
0.3% Emulsifier—Datem
0.15% Guar gum The Sp. Gr. was found to be 1.092 g/ml and the total solids content was 33.55%.

Example 7

The ingredients of Example 6 were mixed and further processed according to the method illustrated in FIG. 7. In particular, the milk powder is mixed with the other ingredients in a mixer. The mixture is homogenized in an homogenizer system in which a first stage is carried out at a pressure of about 400–600 psig, preferably at about 500 psig, and a second stage is carried out at a pressure of about 1500–2500 psig, and preferably at about 2000 psig. The homogenization temperature is carried out at 70–82° C. The homogenization is necessary to lower the size of fat particle to a suitable level.

The homogenized milk mix experiences a pasteurizing step to a temperature of about 75–85° C. during about 20–50 seconds. The pasteurized component is cooled so as to reach a relatively low temperature of about 4° C. or below. Then, the pasteurized component is allowed to age in refrigerating conditions overnight or a minimum of at least 4 hours prior to the next operation. The low temperature of the aged mix has to be kept at 3–4° C. or below in order to achieve good air incorporation in subsequent operations.

Freezing can then be carried out on the milk mix in a conventional ice cream freezer. The component is so drawn to a temperature of about −2 to −6° C., preferably −2 to −4° C. Due to the relatively higher temperature for the mix of the invention with respect to usual temperature for ice cream products (−8° C. and below), the mix does not receive as much as mechanical treatment in the freezer.

An overrun of 80 to 130% can be achieved with the frozen milk phase as produced in the freezer. Freezing time span is dependent on the type of freezer used. In particular, the length, configuration and type of dasher, the mix flow rate, capacity, etc., influence the residence time. In the present example, APV Crepaco and Hoyer KF 500 freezers were used for freezing the milk mix.

The frozen product can then be introduced into molds as described above with regard to FIG. 8 to produce a final product of the frozen milk component and the flavored beverage component. If desired, a stick can be provided for each molded product in a conventional manner.

What is claimed is:

1. A frozen product from which a beverage with a foamed milk-based topping can be prepared, the frozen product comprising a beverage-forming component and a frozen milk component which incorporates a gas therein at an overrun of at least about 80%, with the components constituting distinct separate portions of the product and being present in amounts sufficient to form a beverage having a foamed milk topping thereon after addition of a liquid to the product and melting of the frozen milk component.

2. The product of claim 1, wherein the milk component includes whole or skim milk and is aerated to an overrun of between about 110 to 150%.

3. The product of claim 1, wherein the milk component includes an emulsifier or a blend of emulsifiers in an amount sufficient to enhance gas incorporation into the component.

4. The product of claim 3, wherein the emulsifier comprises a monoglyceride in an amount of about 0.05 to 0.6% by weight of the component.

5. The product of claim 1, wherein the milk component includes a thickening agent in an amount sufficient to increase the viscosity of the milk before it is frozen.

6. The product of claim 5, wherein the thickening agent is a hydrocolloid and is present in an amount of about 0.05 to 0.5% by weight of the milk component.

7. The product of claim 1, wherein the milk component comprises water, skim milk in an amount of about 10 to 30% by weight, a fat in an amount of about 10 to 30% by weight, sugar in an amount of up to 8% by weight, an emulsifier or a blend of emulsifiers in an amount of about 0.01 to 0.8% by weight, and a thickening agent in an amount of about 0.05 to 0.5% by weight.

8. The product of claim 1, wherein the fat is cream having a fat content of about 10 and 50% fat.

9. The product of claim 1, wherein the beverage-forming component is a coffee, cocoa, chocolate-based, fruit flavor, or a vegetable flavor component or a mixture thereof.

10. The product of claim 1, wherein the gas is oxygen, nitrogen, carbon dioxide, air or other mixtures thereof, and the milk concentrate component is frozen and aerated to an overrun from about 150 to 250%.

11. The product of claim 1, wherein the milk concentrate component is present in an amount of about 10 to 35 grams and has a solids content from about 10 to 50% by weight.

12. The product of claim 1, which further comprises a handle for supporting the beverage-forming component and milk concentrate.

13. The product of claim 1, wherein the distinct portions of the components are present in layers.

14. The product of claim 1, having the shape of a bar comprising a core of the beverage-forming component and an outer shell of the frozen milk component encasing the core.

15. A package comprising a beverage-forming component and a frozen milk concentrate component, with the frozen milk concentrate component incorporating a gas at an overrun of at least 80%, and the components being present in amounts sufficient to form a beverage having a foamed milk topping thereon after addition of a liquid thereto and melting of the frozen milk concentrate component.

16. The package of claim 15, comprising a first compartment for the beverage-forming component and a second compartment for the frozen milk concentrate component.

17. The package of claim 15, wherein the frozen milk component has the shape of a bar and the beverage-forming component is separately formed and packaged from the frozen milk component.

18. The package of claim 15, in the form of a cup wherein the beverage-forming component and frozen milk concentrate component are present in amounts sufficient for one serving, with the cup being adapted to receive and retain liquid for forming the beverage.

19. A method of producing a frozen product comprising of a beverage-forming component and a frozen milk component, the product from which a beverage having foamed milk-based topping can be prepared by adding liquid to the product and dissolving the frozen milk component, which method comprises:

preparing a milk-based phase by mixing ingredients;

homogenizing the milk-based phase;

heat-treating the milk-based phase;

incorporating a gas into the milk-based phase until an overrun of at least about 80 percent is achieved;

freezing the milk-based phase to form the frozen milk component; and filling a mold with the frozen milk component and the beverage-forming component to form the product.

20. The method of claim 19, wherein the gas incorporating step comprises aerating the milk-based phase.

21. The method of claim 20, wherein the gas incorporating step comprises freezing the milk-based phase while applying a mechanical tossing to the milk-based phase.

22. The method of claim 20, which further comprises withdrawing a central portion of the frozen milk component from the filled mold to form an outer shell of the frozen milk phase about an open central cavity, and at least partially filling the cavity with the beverage-forming component to form a core of the frozen product.

23. The method of claim 20, which further comprises filling any remaining portions of the cavity with additional frozen milk component to form a encased core of the beverage-forming component.

24. The method of claim 20, which further comprises aging the heat-treated milk-based phase at least 4 hours before the freezing step.

25. The method of claim 19, wherein gas is incorporated into the milk-based phase until an overrun of at least about 80% is achieved prior to freezing of the milk-based phase.

26. A frozen product produced according to claim 19.

27. A frozen product from which a beverage with a foamed milk-based topping can be prepared, the frozen product comprising a beverage-forming component and a frozen milk component, the product having the shape of a bar comprising a core of the beverage-forming component and an outer shell of the frozen milk component substantially encasing the core, wherein the milk component has an overrun of at least about 80%, and wherein the product can be converted into a beverage having foamed milk-based topping after adding liquid to the product and melting the frozen milk component.

28. The product of claim 27 wherein the milk component has an overrun of between about 110 to 250%.

* * * * *